United States Patent Office 2,987,070
Patented June 6, 1961

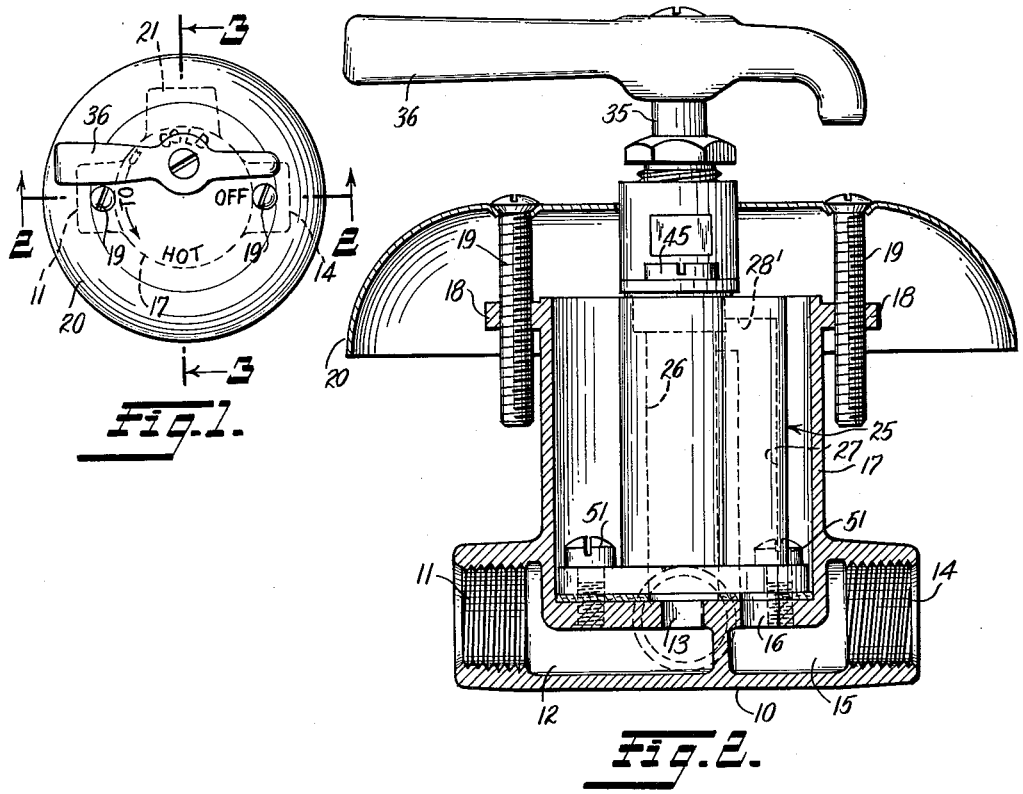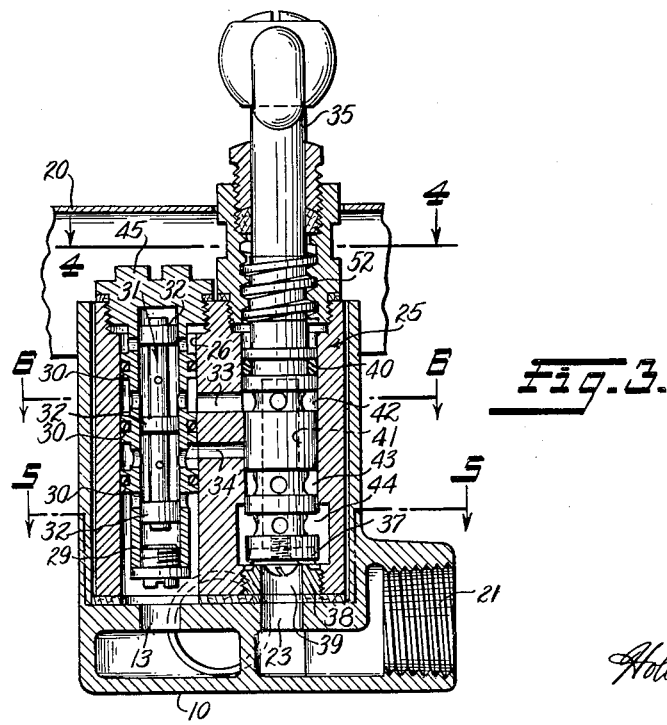

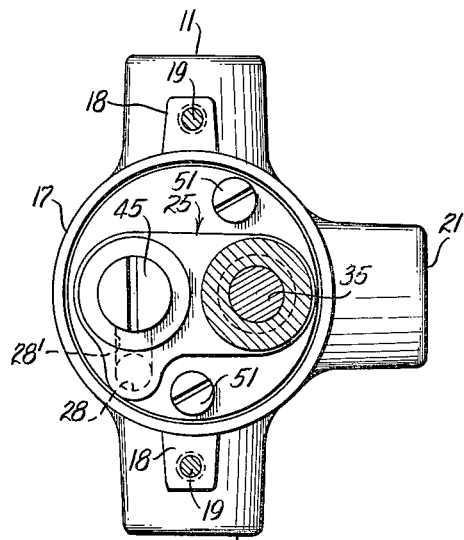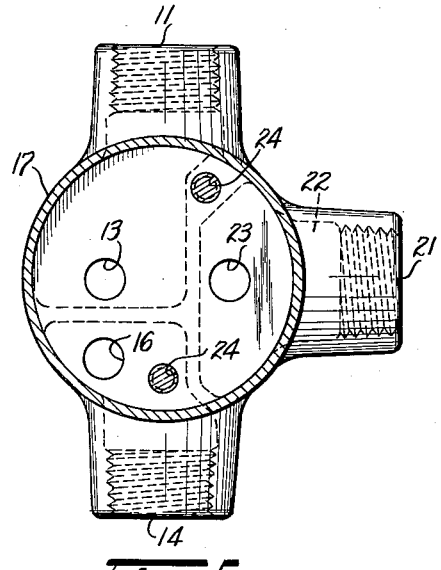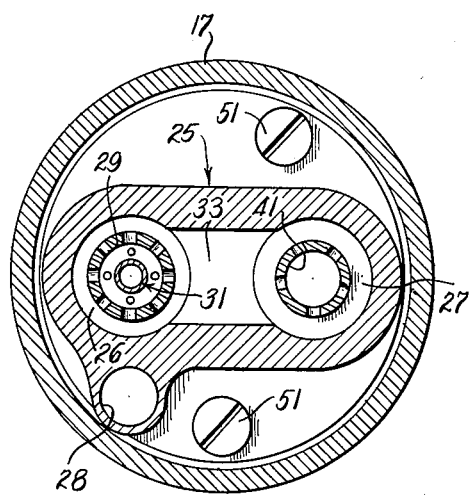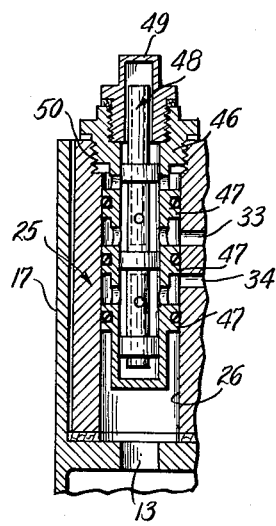

2,987,070
BALANCED PRESSURE SHOWER MIXING VALVE
James Fraser, Wilmington, Del., assignor to Speakman Company
Filed July 23, 1959, Ser. No. 829,125
3 Claims. (Cl. 137—100)

This invention relates in general to mixing valves for hot and cold water and more in particular to mixing valves in which the water outlet chamber is manually adjusted.

Heretofore mixing valves of this type have had the chambered block unit an integral part of the valve body proper, access to the valve being obtained by the removal of the hub assembly. This has not proven satisfactory because of the extreme difficulty in replacing valves of this type.

It is therefore an object of this invention to provide a new and improved mixing valve in which the user is prevented from being scalded by failure of the cold water supply.

It is also an object of this invention to provide a mixing valve wherein the chambered block can be readily removed from the valve body proper without disconnecting said valve body.

It is a still further object of this invention to provide a mixing valve having a chambered block, wherein access to the floating plunger may be had without removing the manually adjustable element.

Further and specific objects of the invention are to provide a mixing valve of the character specified in which most of the accurate machining operations required in the construction of the valve may be simply turning and drilling operations, and in which all of the relatively immovable parts are readily accessible for inspection, cleaning and replacing.

The various features of novelty which characterize this invention are pointed out with particularity in the claims annexed and forming part of this specification. For a better understanding of the invention, however, its advantages and specific objects obtained by its use. reference should be had to the accompanying drawings and descriptive matter in which have been illustrated and described preferred embodiments of the invention.

In the drawings:

FIG. 1 is a top plan view of the mixing valve of the present invention.

FIG. 2 is an enlarged sectional view, partly in elevation substantially on line 2—2 of FIG. 1.

FIG. 3 is a vertical sectional view substantially on line 3—3 of FIG. 1.

FIG. 4 is a horizontal sectional view on line 4—4 of FIG. 3.

FIG. 5 is a horizontal sectional view on line 5—5 of FIG. 3.

FIG. 6 is an enlarged horizontal sectional view on line 6—6 of Fig. 3, and

FIG. 7 is a fragmentary vertical sectional view of a modified form of floating piston.

In Figures 1 to 6 inclusive have been illustrated a mixing valve adapted to mix hot and cold water in varying proportions and in which the pressure of the water mixed is equalized prior to their mixture, by mechanical means including a separate piston and cylinder element. In Fig. 2 the valve body 10, having a hot water inlet port 11 connects to the hot water chamber 12, and a hot water outlet port 13. A cold water inlet port 14 connects to the cold water chamber 15, having a cold water outlet port 16 connected thereto. This body has an upstanding portion 17 on the upper side thereof which has two lateral projections 18, 18, having threaded recesses therein to receive the bolts 19, 19, which retain the bell-shaped element 20 in position. A discharge port 21 (shown in Fig. 5) is connected to a discharge chamber 22, having a port 23. Threaded recesses 24, 24 are drilled in the body portion to receive a holding means for a chambered block valve unit 25.

The chambered block unit 25 has two vertical chambers 26, 27 therein having their axes substantially parallel. The chamber 26 has an opening in the bottom thereof connected to the hot water inlet 13 in the body portion and having a conduit 28 parallel to the chamber 26 and connected to the cold water outlet port 16 of the body portion. Within the chamber 26 is a hollow plunger retaining member 29 shown in Fig. 3. This member 29 has three grooved shoulders 30, 30, 30 in spaced relation to each other on the circumference of the retaining member 29. Each of these portions 30 have an O-ring in a groove therein to retain this member in water-tight relation to the side walls of the vertical chamber 26 and divide this chamber into a lower portion connected to the hot water inlet 13 and an upper portion connected by means of a cold water conduit 28 to the cold water outlet 16. A floating plunger 31, having three bosses 32, 32, 32 on the circumference thereof floats within the retaining member 29 in such a manner as to allow the hot and cold water to flow therethrough as long as the pressure is in balanced relation, but upon the failure of either the hot or the cold water this piston closes the ports 33, 34 leading from the piston retaining member 29 connecting with the valve chamber 27. The retaining member 29 is made with a unitary slotted cap 45 on the upper end thereof which is received by and held in position by threads in the upper side walls of the chamber 26.

An alternate form of this plunger retaining member is shown in Fig. 7 wherein the plunger retaining member 46 has shoulders 47, 47, 47 on the circumference thereof dividing the chamber 26 into three portions, just as described above. The plunger member 48 is retained within this plunger holding member by means of the auxiliary cap 49 which screws into the upper end of the plunger retaining member 46. This plunger retaining member is held in position by means of the screw threads 50 in the upper circumference, which are received by and retain this element in position with matching threads in the upper portion of the chamber 26. This allows the removal of the plunger member 48 without removing the floating plunger retaining member 46.

Within the valve chamber 27 is a valve stem 35 having the manually adjustable handle 36 on the upper end thereof. On the lower end of this stem is the valve element 37 having a washer retained therein which contacts the valve seat 38 surrounding the outlet port 39 which is in alignment with the outlet port 23 in the body portion. The upper part of the valve stem has an O-ring 40 thereon to retain the same in water-tight engagement with the side walls of the valve chamber 27. The portion of the stem below the O-ring is hollow and has a conduit 41 therein. Opening into the upper part of this conduit is the cold water chamber 42 and below this is the hot water chamber 43 also opening into the conduit 41. The valve stem between the chambers 42 and 43 is in water-tight engagement with the side walls of the valve chamber 27. Below the chamber 43 is another portion of the valve stem which fits the valve chamber so as to retain the same in water-tight connection with the side walls of the chamber. The conduit 41 has an opening 44 through the walls of the valve stem 35.

Upon installation of this valve the cold water conduit (not shown) is connected to the cold water inlet 14 in the body portion and the hot water conduit (not shown) is connected to the hot water inlet 11. The discharge outlet 21 is connected to a conduit (not shown) leading to the shower. The body portion then has the chambered block valve unit assembled thereon by means of the screw bolts 51, 51 being received by and held in position by the threaded recesses 24, 24 in the body portion. The handle 36 is removed and the bell-shaped element 20 is assembled using the bolts 19 to retain it in position. The handle 36 is then reassembled on the valve stem 35. The hot water admitted through the inlet 11 flows into the chamber 12 through the port 13 and into the bottom portion of the chamber 26 and is retained therein by the floating plunger 31 until such a time as the cold water which is admitted through the inlet 14 flowing through the chamber 15 through the port 16 into the chamber 28 is admitted to the top portion of the chamber 26 through port 28'. When the cold water and hot water are in balance the floating plunger will equalize the openings in the sleeve 29 and admit water to the ports 33 and 34 leading to the chamber 27. The hot water port 34 is closed by the valve stem and the cold water port 33 is in alignment with the cold water chamber 42. This allows the cold water to flow into the conduit 41 within the stem and through the exhaust opening 44. It is prevented from flowing into the outlet port 39 and into the chamber 22 and the discharge outlet 21 by means of the valve seat surrounding the port 39 which is in contact with the valve element 37 on the bottom of the valve stem. Upon rotating the handle 36 the valve stem 35 rises due to the threads 52 thereon. This gradually closes the cold water port 33 and opens the hot water port 34, thereby allowing hot water to flow into the hot water chamber 43 and into the conduit 41, allowing the mixture of hot and cold water to be discharged from the port of the valve.

While in accordance with the provisions of the statutes there has been illustrated and described the best forms of embodiment of this invention known, it will be apparent to those skilled in the art that changes may be made in the form of the apparatus disclosed without departing from the spirit of this invention as set forth in the appended claims, and that in some cases certain features may be used to advantage without a corresponding use of other features.

What is claimed is:

1. In a mixing valve for hot and cold water of the type having means for preventing sudden changes in temperature caused by fluctuation in the pressure of either component of the mixing valve wherein the control means comprises a valve body having two inlet ports and an outlet port, a chambered valve block unit held in watertight relation to the valve body with a gasket therebetween, said chambered block comprising hot and cold water inlet ports in connection with a piston chamber having a removable hollow plunger retaining member containing a floating piston therein to control the flow of water from each of the inlet ports into the piston chamber, said piston chamber being closed by a removable closure element on the top thereof, a valve chamber adjacent to the piston chamber and having its principal axis parallel to the axis of the piston chamber, hot and cold water ports from the piston chamber to the valve chamber, a valve stem retained within the valve chamber and having a valve element on the lower end thereof in contact with a valve seat at the bottom of the valve chamber and an opening from the valve seat to the outlet port, and means for operating the valve stem in a vertical direction to open and close the same.

2. In a mixing valve for hot and cold water of the type having means for preventing sudden changes in temperature caused by fluctuation in the pressure of either component of the mixing valve wherein the control means comprises a valve body having two inlet ports and an outlet port, a chambered valve block unit held in watertight relation to the valve body with a gasket therebetween, said chambered block comprising hot and cold water inlet ports in connection with a piston chamber having a removable hollow plunger retaining member containing a floating piston therein to control the flow of water from each of the inlet ports into the piston chamber, said piston chamber being closed by a removable closure element on the top thereof, said closure element comprising a removable cap of the same internal diameter as said piston chamber, a valve chamber adjacent to the piston chamber and having its principal axis parallel to the axis of the piston chamber, hot and cold water ports from the piston chamber to the valve chamber, a valve stem retained within the valve chamber and having a valve element on the lower end thereof in contact with a valve seat at the bottom of the valve chamber and an opening from the valve seat to the outlet port, and means for operating the valve stem in a vertical direction to open and close the same.

3. In a mixing valve for hot and cold water of the type having means for preventing sudden changes in temperature caused by fluctuation in the pressure of either component of the mixing valve wherein the control means comprises a valve body having two inlet ports and an outlet port, a chambered valve block unit held in watertight relation to the valve body with a gasket therebetween, said chambered block comprising hot and cold water inlet ports in connection with a piston chamber having a hollow plunger retaining member containing a floating piston therein to control the flow of water from each of the inlet ports into the piston chamber, said piston chamber being closed by a removable closure element on the top thereof, said closure element comprising a removable cap of the same internal diameter as the piston chamber and having a removable screw element in the top thereof, having the same internal diameter as the floating piston, a valve chamber adjacent to the piston chamber and having its principal axis parallel to the axis of the piston chamber, hot and cold water ports from the piston chamber to the valve chamber, a valve stem retained within the valve chamber and having a valve element on the lower end thereof in contact with a valve seat at the bottom of the valve chamber and an opening from the valve seat to the outlet port, and means for operating the valve stem in a vertical direction to open and close the same.

References Cited in the file of this patent

UNITED STATES PATENTS

| | | |
|---|---|---|
| 962,111 | Assmann | June 21, 1910 |
| 1,097,433 | Hill | May 19, 1914 |
| 2,158,342 | Trader | May 16, 1939 |
| 2,443,499 | Fraser | June 15, 1948 |
| 2,470,025 | Fraser | May 10, 1949 |